United States Patent

[11] 3,625,921

| [72] | Inventors | George S. Wooster<br>Hamburg;<br>Frank M. Delgado, Tonawanda, both of N.Y. |
|---|---|---|
| [21] | Appl. No. | 729,378 |
| [22] | Filed | May 15, 1968 |
| [45] | Patented | Dec. 7, 1971 |
| [73] | Assignee | Allied Chemical Corporation<br>New York, N.Y. |

[54] POLYURETHANE COATING COMPOSITIONS PREPARED FROM 4,4'-METHYLENE BIS(CYCLOHEXYLISOCYANATE) AND POLYETHER TRIOL BLENDS
1 Claim, No Drawings

[52] U.S. Cl. ................................................. 260/77.5 AT,
117/124 E, 117/132 B, 260/18 TN, 260/31.2
N, 260/31.4 R, 260/32.8 N, 260/33.2 R, 260/33.6
UB, 260/77.5 AP
[51] Int. Cl. ................................................. C08q 22/06

[50] Field of Search ................................................. 260/77.5
AP, 2.5 AP, 77.5 AT, 2.5 AT

[56] References Cited
UNITED STATES PATENTS
3,354,100  11/1967  Kuryla ........................... 260/77.5 X OTHER REFERENCES
Siefken, Annalen der Chemie, 562, 1949, pp 121 & 125
Saunders et al., Polyurethanes, Part II, Interscience, NY, 1964, pp 477–485

Primary Examiner—Donald E. Czaja
Assistant Examiner—M. J. Welsh
Attorney—Jay P. Friedenson ABSTRACT: Novel polyurethane coating compositions characterized by excellent curing properties are prepared from 4,4'-methylene bis(cyclohexylisocyanate) and mixtures of polyether triols.

POLYURETHANE COATING COMPOSITIONS PREPARED FROM 4,4'-METHYLENE BIS(CYCLOHEXYLISOCYANATE) AND POLYETHER TRIOL BLENDS

Polyurethane compositions derived from 4,4'-methylene bis(cyclohexyl isocyanate) are known to provide excellent properties for a variety of coating applications. Coatings derived, for example, from the reaction of this diisocyanate with a polyol are characterized by excellent toughness, flexibility and color stability, and, particularly in the presence of a catalyst, e.g. an organo-tin compound, will dry to a tack-free film in a few hours. However, a complete cure, that is "through-cure" of the coating generally requires a considerably longer time, in the order of several days. For many applications the drying of the coating to a tack-free state is sufficient to permit normal use of the object or structure that has been coated, even though "through-cure" has not taken place. However, in applications where the coating is subjected to particularly heavy use, as in the case of seamless floorings, it is important that through-cure take place before the coated surface is put into normal use. In such cases a rapid through-cure rate of the coating composition is particularly advantageous.

It is an object of the present invention to provide polyurethane coating compositions having substantially improved through-cure rates.

It is a further object to provide polyurethane coating compositions having improved tackfree drying times, and improved hardness characteristics in the cured coating.

It is another object of this invention to provide method of producing such improved coating compositions.

These and other objects and advantages which will be apparent hereinafter are accomplished in accordance with the present invention which is described and claimed below.

We have discovered that novel polyurethane coating compositions characterized by faster through-cure rates can be prepared by reacting a mixture comprising 70 to 80 mol percent of 4,4'-methylene bis (cyclohexyl isocyanate) and 20 to 30 mol percent of a blend of at least two polyether triols, said blend comprising (A) 20 to 30 mol percent of triols having an (effective molecular weight) $\overline{Emw}$ of about 1000 to 2000 and (B) 70 to 80 mol percent of a triol having an $\overline{Emw}$ of about 250 to 850. The mixture is further characterized by a cross-linking equivalent weight (Mc) determined according to the formula:

$$Mc = \frac{\text{Total weight of mixture}}{\text{mols of triol}}$$

of between about 1200 and 1500.

The effective molecular weight of the triols employed is important in achieving the desired properties in the final product and is governed by the hydroxyl number of the triol according to the relationship:

$$\overline{Emw} = \frac{(3)(56,100)}{\text{OH No.}}$$

Thus a triol having an $\overline{Emw}$ of between 1000 and 2000 inherently has a hydroxyl number of between about 80 and 170; and a triol having an $\overline{Emw}$ of between 250 and 850 inherently has an hydroxyl number of between about 190 and 700.

Suitable polyether triols include for example those prepared by condensation of an alkylene oxide, such as ethylene oxide, propylene oxide, mixtures thereof and the like with a low molecular weight triol such as glycerine, trimethylol propane, hexanetriol—1,2,6 and the like. Such triols are commercially available in a wide range of molecular weight, and thus in a wide range of hydroxyl numbers. A polyether triol prepared, for example, from the condensation of ethylene oxide and glycerine would have the structure:

$$H_2CO(C_2H_4)_nOH$$
$$HCO(C_2H_4)_{n'}OH$$
$$H_2CO(C_2H_4)_{n''}OH$$

wherein $n$, $n'$ and $n''$ are integers.

The hydroxyl number of a polyether is defined in accordance with ASTM-D1638 as the number of milligrams of potassium hydroxide equivalent to the hydroxyl content of 1 gram of the sample. The hydroxyl number of a specific polyether triol can be determined in accordance with the test procedures described in detail in the aforementioned ASTM-D1638.

A general discussion of polyethers can be found in Saunders et al. Polyurethanes, Chemistry and Technology, Part I. Chemistry, High Polymers Vol. XVI, Interscience Publishers, New York, 1962, pp. 32–44.

4,4'-Methylene bis(cyclohexyl isocyanate) hereinafter referred to as $H_{12}MDI$, is the isocyanate and may be used in any of its various isomeric forms or mixtures thereof. The compound exists in three different isomeric forms depending on the position, i.e. cis or trans, of the isocyanate group with respect to the methylene bridging group. The usual commercial grades of the isocyanate are mixtures of various proportions of the three isomers, i.e. the cis-cis, cis-trans, and trans-trans isomers. The isomers can be separated by conventional physical separation techniques. Either the pure isomers or mixtures thereof are suitable for use in the compositions of the present invention. Because of the faster reactivity of the trans isomer with hydroxyl groups, $H_{12}MDI$ containing a preponderance of trans isomer are preferred.

The novel coating compositions of the present invention are the "one can" type and may be employed in a conventional solvent and applied to a substrate by the usual methods, spraying, dipping, flow-coating, and the like. Conveniently the solvent is added prior to reaction of the triols and $H_{12}MDI$, thereby providing a reaction medium as well as a vehicle for the coating composition. Suitable solvents include for example, the lacquer type organic solvents, such as ethyl acetate, butyl acetate, toluene, xylene, cyclohexanone, bis ($\beta$-ethoxy ethyl) ether, glycol monoether acetate and the like or mixtures thereof. Preferably such solvent mixtures will contain between about 20 percent and 70 percent by weight of nonvolatiles.

Preferably a catalyst is employed to promote the formation of the polyurethane reaction product. Typical catalysts include, for example, the well-known metal "driers," such as lead naphthenate, and organo-mercury compounds, such as phenyl mercuric propionate; and organo-tin compounds, such as dibutyltin dilaurate, tetramethyl tin, dimethyl dioctyltin, dilauryltin difluoride, di-2-ethylhexyltin bis (monobutylmateate), tri-n-butyl tin acetonate and the like and mixtures thereof. The catalyst is advantageously employed in an amount of about 0.005 to 0.5 percent by weight based on the weight of polyurethane reactants. A small additional amount of catalyst is generally added after the reaction product has been formed to improve its drying properties, usually 0.05 to 0.5 percent by weight of the nonvolatiles.

These novel coating compositions can also contain stabilizers, flowing agents, plasticizers and the like.

PREPARATION OF COATING COMPOSITIONS

The coating compositions can be prepared by forming a dry mixture of the solvent, polyol and isocyanate and then adding the catalyst. In the preferred procedure the solvent and the polyol are first mixed and then azeotropically distilled to remove any free water. Preferably, the reaction is carried out under a blanket of a dry inert gas such as nitrogen to prevent contact of the reaction mixture and atmospheric moisture. The mixture is heated to between about 90–110° C. for a period of at least 1 hour.

The reaction may be considered complete when the measured "amine equivalent" of the batch exceeds the theoretical value usually in the range of about 10 to 20 percent over the theoretical value. By "amine equivalent" is meant the weight of the mass which contains one equivalent weight of isocyanate, the weight units being consistent. It is determined by a well-known analytical procedure involving a reaction between isocyanate and measured excess of n-dibutyl amine to form the corresponding urea and back-titration with standard HCl solution to measure the unreacted n-butylamine. The theoretical amine equivalent is given by the expression $$AE = WB/[n(NCO) - n(OH)]$$

wherein:
AE = amine equivalent
WB = weight of batch
n(NCO) = number of equivalents of isocyanate (Total) charged to process
n(OH) = number of equivalents of hydroxyl (Total) charged to process.

The amine equivalent is determined as follows: dilute 6 to 25 grams of sample, with 30-50 cc. of C.P. toluene, add 20 cc. of 2 N solution of dibutyl amine in toluene, heat 5 to 10 minutes (do not boil), cool, add 100 cc. of methanol, add 10 drops of Bromphenol Blue indicator solution, titrate with 1 N HCl to the disappearance of blue color, run a blank. The value of the measured amine equivalent is calculated by the equation:

$$AE = \frac{1000 WS}{(TB-TS)N}$$

wherein:
WS = weight of sample in grams
TB = titration of blank in ml. HCl
TS = titration of sample in ml. HCl
N = normality of HCl The analytical procedure is similar to a method for assaying tolylene diisocyanate described in paragraphs 5-13 inclusive of ASTM method 1638-60T. (See U.S.P. 3,351,573 col. 6, lines 54ff.)

To further illustrate the present invention and the manner in which it may be practiced the following specific examples are set forth.

EXAMPLES 1 and 2

Coating compositions in accordance with the present invention were prepared using the preferred procedure described above using the amounts of ingredients shown in the table below. The coating compositions were evaluated with respect to cure rates, hardness and drying times in the manner described herein below. For purposes of comparison the compositions of examples 1a and 2a which fall outside of the parameters of this invention, were similarly prepared and evaluated.

To each coating composition prepared as described below, an additional 0.3 percent dibutyltin dilaurate catalyst (based on the amount of total nonvolatiles) was added prior to the actual coating application, to accelerate the drying thereof.

THROUGH CURE RATES

The through-cure rates of the foregoing compositions were evaluated as follows: A film was prepared from each composition, by applying a few drops of the composition on a NaCl plate and smearing between two plates. The films were cured at 50 percent relative humidity and 72° F. At various intervals during curing, the degree of cure was measured in terms of free—NCO groups by infrared absorbance at 4.45 u, using a Perkin-Elmer Infrared Unit No. 337. The percent cure was calculated as:

$$\text{Percent cure} = \frac{\text{Initial absorbance} - \text{absorbance at time } (t)}{\text{Initial absorbance}}$$

The percent cure for each sample, taken at the times shown was as follows:

| Example | 1 | 2 | 2a | 1a |
|---|---|---|---|---|
| Time | % | % | % | % |
| 1 day | 54.0 | 43.5 | 20.2 | 36.8 |
| 2 days | 63.4 | 51.4 | 28.9 | 42.9 |
| 3 days | 67.0 | 54.4 | 29.6 | 49.6 |
| 4 days | 74.0 | 61.0 | 36.0 | 56.0 |

HARDNESS OF COATINGS

Coatings were prepared from each composition by pouring into a metal mold and evaporating the solvent to provide a dry film of about 60 mils thickness. The coatings were cured at 50 percent relative humidity and 72° F. for 6 days and then tested for "Shore D" hardness described in ASTM D-1706 test procedure. The results as shown below indicate the advantages of the present compositions with regard to improved hardness characteristics:

| Example | 1 | 1a | 2 | 2a |
|---|---|---|---|---|
| Shore D Hardness (±2) | 45 | 35 | 50 | 35 |

Tackfree Time

The novel compositions also provide the advantage of achieving a tackfree state in a relatively short period of time compared to other coatings having approximately the same cross-linking equivalency (Mc). The following data was obtained from films applied to a glass plate, drawn down with a Bird Applicator and cured at 35-39 percent relative humidity at 77° F.

| Example | 1 | 1a | 2 | 2a |
|---|---|---|---|---|
| Mc | 1410 | 1440 | 1278 | 1292 |
| Tack-free Time (hours) | 2.4 | 5.5 | 0.6 | 1.8 |

TABLE

| Example | 1 | 1a | 2 | 2a |
|---|---|---|---|---|
| Composition (grams): | | | | |
| 4,4'-methylenebis (cyclohexyl isocyanate) (trans/cis ratio=about 75/25) | 470 | 147.5 | 165 | 165 |
| Triol (total) | 470 | 152.3 | 135 | 135 |
| Pluracol TP-1540[1] (OH No.=110) | 258 | | 80 | |
| Pluracol TP-740[1] (OH No.=230) | | 152.3 | | 110 |
| Pluracol TP-440[1] (OH No.=404) | 212 | | | |
| Pluracol TP-340[1] (OH No.=561) | | | 55.0 | 25 |
| Solvent (xylene) | 1,408 | 450 | 450 | 450 |
| Catalyst (dibutyltin dilaurate) | 0.325 | 0.10 | 0.10 | 0.10 |
| NCO/OH | 1.8 | 1.8 | 1.8 | 1.8 |
| Crosslinking equivalent wt. (mc.) | 1,410 | 1,440 | 1,278 | 1,292 |
| Amine equivalent: | | | | |
| Determined | 1,635 | 1,630 | 1,460 | 1,460 |
| Theoretical | 1,470 | 1,460 | 1,210 | 1,265 |
| Composition (mol percent): | | | | |
| 4,4'-emthylenebis (cyclohexyl isocyanate) | 73.25 | 73.0 | 72.0 | 72.05 |
| Triol (total) | 26.75 | 27.0 | 27.00 | 27.95 |
| TP-1540[1] | 6.75 | | 6.15 | |
| TP-740[1] | | | | 18.00 |
| TP-440[1] | 20.00 | | | |
| TP-340[1] | | | 21.85 | 9.95 |
| Triol composition: | | | | |
| Mol percent of high $\overline{Emw}$ triol (TP-1540) | 28.4 | | 22.3 | |
| Mol percent of high $\overline{Emw}$ triol (TP-740) | | 100.0 | | 64.5 |
| Mol percent of low $\overline{Emw}$ triol (TP-440) | 75.2 | | | |
| Mol percent of low $\overline{Emw}$ triol (TP-340) | | | 77.7 | 35.5 |

[1] Commercial polyether triols based on propylene oxide and trimethylolpropane the numbers of which indicate the average molecular weights.

We claim:

1. A polyurethane prepolymer comprising the reaction product of a mixture comprising 70 to 80 mol percent of 4,4'-methylenebis (cyclohexyl isocyanate) and 20 to 30 mol percent of a blend of at least two polyether triols comprising (A) 20 to 30 mol percent of triols having an $\overline{Emw}$ of about 1000 to 2000 and (B) 70 to 80 mol percent of a triol having an $\overline{Emw}$ of about 250 to 850; said mixture being further characterized by a cross-linking equivalent weight (Mc) determined according to the formula:

$$Mc = \frac{\text{Total weight of mixture}}{\text{mols of triol}}$$

of between about 1200 and 1500.